United States Patent
Pan et al.

(10) Patent No.: US 10,139,628 B2
(45) Date of Patent: Nov. 27, 2018

(54) HEAD-MOUNTED DISPLAY

(71) Applicant: Coretronic Corporation, Hsin-Chu (TW)

(72) Inventors: Haw-Woei Pan, Hsin-Chu (TW); Chih-Hsien Tsai, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/405,316

(22) Filed: Jan. 13, 2017

(65) Prior Publication Data

US 2017/0219827 A1    Aug. 3, 2017

(30) Foreign Application Priority Data

Jan. 28, 2016    (TW) .............................. 105102606 A

(51) Int. Cl.
   *G02B 27/01*   (2006.01)
   *G02F 1/1335*  (2006.01)
   *G02F 1/137*   (2006.01)
   *G02B 5/30*    (2006.01)

(52) U.S. Cl.
   CPC .......... *G02B 27/0172* (2013.01); *G02B 5/30* (2013.01); *G02F 1/13731* (2013.01); *G02F 1/133526* (2013.01); *G02F 1/133528* (2013.01); *G02B 2027/0123* (2013.01); *G02F 2203/01* (2013.01)

(58) Field of Classification Search
   CPC .................. G02B 27/0172; G02B 5/30; G02B 2027/0123; G02F 1/133528; G02F 1/133526; G02F 1/13731; G02F 2203/01
   USPC .......................................................... 349/11
   See application file for complete search history.

(56) References Cited

U.S. PATENT DOCUMENTS

| | | | |
|---|---|---|---|
| 8,964,299 B2 | 2/2015 | Chang | |
| 2004/0257663 A1 | 12/2004 | Edelmann | |
| 2007/0097277 A1* | 5/2007 | Hong | G02B 3/14 |
| | | | 349/11 |
| 2014/0118829 A1 | 5/2014 | Ma et al. | |

(Continued)

FOREIGN PATENT DOCUMENTS

| CN | 102628579 | 8/2012 |
|---|---|---|
| CN | 202486434 | 10/2012 |

(Continued)

OTHER PUBLICATIONS

"Notice of allowance of Taiwan Counterpart Application," dated May 3, 2017, p. 1-p. 4.

*Primary Examiner* — Nathanael R Briggs
*Assistant Examiner* — William Peterson
(74) *Attorney, Agent, or Firm* — JCIPRNET

(57) ABSTRACT

A head-mounted display including a transparent display, a first liquid crystal lens and a second liquid crystal lens is provided. The transparent display is adapted to emit an image light beam. The first liquid crystal lens is disposed beside the transparent display. The transparent display is disposed between the first liquid crystal lens and the second liquid crystal lens. The second liquid crystal lens is adapted to receive an ambient light beam. The image light beam passes through the first liquid crystal lens by the phase changing of the first liquid crystal lens, and then the image light beam passes through a pupil.

6 Claims, 2 Drawing Sheets

(56) References Cited

U.S. PATENT DOCUMENTS

2014/0153102 A1* 6/2014 Chang ............... G02B 27/0172
                                                    359/630
2014/0347267 A1   11/2014 Nishi et al.
2015/0145751 A1    5/2015 Momonoi

FOREIGN PATENT DOCUMENTS

| CN | 104407437 | 3/2015 |
| TW | M388659 | 9/2010 |
| TW | 201544843 | 12/2015 |

* cited by examiner

HEAD-MOUNTED DISPLAY

CROSS-REFERENCE TO RELATED APPLICATION

This application claims the priority benefit of Taiwan application serial no. 105102606, filed on Jan. 28, 2016. The entirety of the above-mentioned patent application is hereby incorporated by reference herein and made a part of this specification.

BACKGROUND OF THE INVENTION

Field of the Invention

The invention relates to a display device, and specifically relates to a head-mounted display.

Description of Related Art

Currently, near eye display (NED) and head-mounted display (HMD) are the newest products that have great potential for development. The NED is currently applied to augmented reality (AR) and virtual reality (VR). In terms of VR, it is an important issue in development about creating sense of reality in the virtual world. In terms of AR, the development specialists focus on how to provide the best image quality by a thinner and lighter NED/HMD device.

Furthermore, in a basic optical structure of the HMD to be actualize the AR display effect, an image light beam used for display is emitted from a projection device and then the image light beam is reflected by a semi-reflective and semi-transmission optical device to enter the user's eyes. The image light beam and the external ambient light beam are all entered into the user's eyes to achieve the AR display effect. However, in the above-mentioned structure (i.e., a kind of conventional optical structure), it is inevitable that the projection device is disposed inside the angle of view of the user's eyes, and the above component occupies a certain space. Therefore, a field of view (FOV) of the image truly displayed by the head mounted display is greatly limited. In order to achieve a wider FOV, currently, one of the conventional solutions is based on a group of optical lenses and mirrors or an optical reflection system that is able to reflect the image light beam multiple times, such that the projection device may be disposed outside of the angle of view of the user's eyes. However, the volume of optical lenses and mirrors group or the optical reflection system usually increases and adds additional weight to the HMD, and a plurality of reflective surfaces of the group of the mirrors still require extremely high precision in assembly and surface shape. Another conventional solution is based on a light guiding component bonded by several light splitting layer elements to guide the image light beam of the projection device into the user's eyes. However, the manufacturing process of the above light guiding component needs a plurality of complicated processes such as coating process, bonding process, alignment process, cutting process and polishing process, etc. Thus, it is very difficult to produce the light guiding member massively. Therefore, it is one of the key points that is worth for the personnel in related field to pay close attention to reduce volume and weight of the HMD, and to simplify the manufacturing process and to achieve the FOV of AR display effect at the same time.

The information disclosed in this "Description of Related Art" section is only for enhancement of understanding of the background of the described technology and therefore it may contain information that does not form the prior art that is already known to a person of ordinary skill in the art. Further, the information disclosed in the "Description of Related Art" section does not mean that one or more problems to be resolved by one or more embodiments of the invention were acknowledged by a person of ordinary skill in the art.

SUMMARY OF THE INVENTION

The invention provides a head-mounted display being able to achieve wide view angle display effect and having a smaller volume, a lighter weight, and a simplified manufacturing process.

The other objectives and advantages of the invention may be further understood through the technical features disclosed in the invention.

In order to achieve one of, a part of or all of the above-mentioned advantages, or to achieve other advantages, an embodiment of the invention proposes a head-mounted display including a transparent display, a first liquid crystal lens, and a second liquid crystal lens. The transparent display is adapted to emit an image light beam. The first liquid crystal lens is disposed beside the transparent display. The transparent display is disposed between the first liquid crystal lens and the second liquid crystal lens. The second liquid crystal lens is adapted to receive an ambient light beam. The image light beam passes through the first liquid crystal lens by phase changing of the first liquid crystal lens of the head-mounted display, and then the image light beam passes through a pupil.

Based on the above, the embodiments of the invention have at least one of the advantages or effects below. In an embodiment of the invention, the transparent display of the head-mounted display is disposed between the first liquid crystal lens and the second liquid crystal lens. The transparent display is adapted to emit the image light beam, and the second liquid crystal lens is adapted to receive the ambient light beam. The image light beam passes through the first liquid crystal lens by the phase changing of the first liquid crystal lens of the head-mounted display, and then the image light beam passes through a pupil. Therefore, the head-mounted display may emit the image light beam and receive the ambient light beam from the outside at the same time, where the image light beam adapted to display an image and the ambient light beam from the outside may coexist and achieve the augmented reality display effect by phase changing in the first liquid crystal lens. Since the transparent display does not cause the problem that the angle of view is blocked, the head-mounted display may achieve wide field of view display effect. Otherwise, the head-mounted display does not need to mount additionally optical lenses and mirrors group or optical reflection system that is able to reflect the image light beam many times. Thus, the head-mounted display becomes smaller and lighter. Besides, the head-mounted display does not need the light guiding component bonded by several light splitting layer elements, therefore, the manufacturing process of the head-mounted display is simplified and it is easier to produce the head-mounted display massively.

Other objectives, features and advantages of the invention may be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof to illustrate the preferred embodiments in which the invention may be practiced, so as to present clearly the above-mentioned and the other technical content, features, and functions related to the invention. In this regard, the directional terminologies, such as "top", "bottom", "left", "right", "front", or "back", etc., are used with reference to the orientation of the Figure(s) being described. Accordingly, the drawings and descriptions will be regarded as illustrative in nature and not as restrictive.

Figure 1:
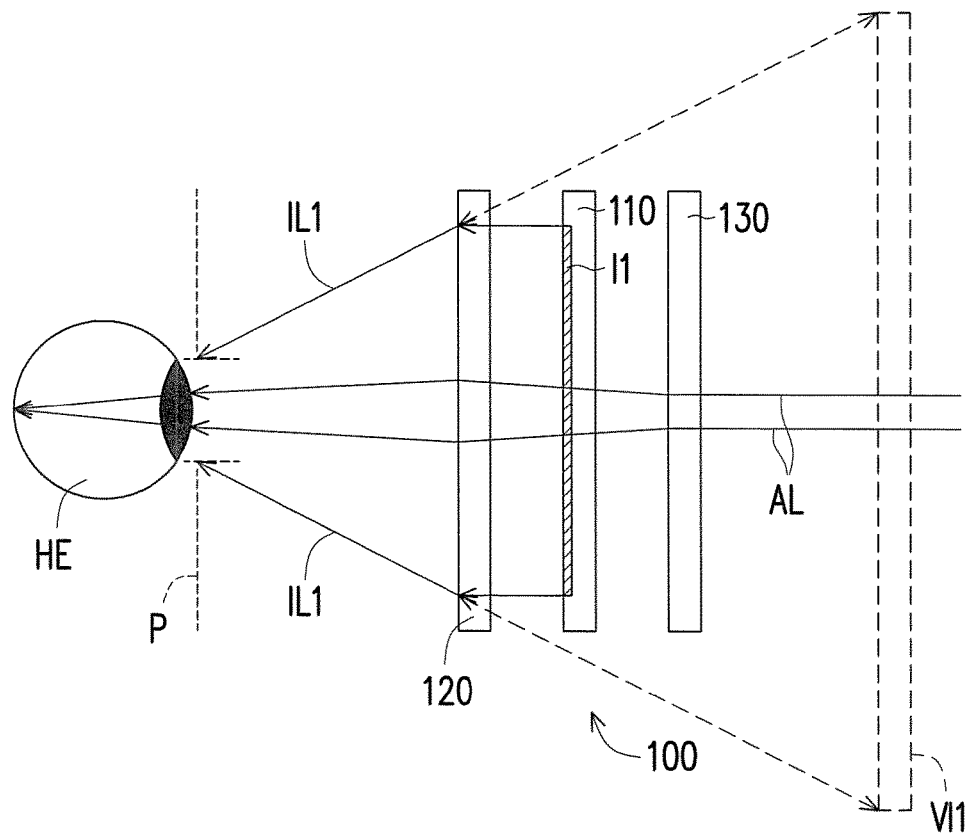
FIG. 1 is a schematic view depicting optical paths of a head-mounted display in an embodiment of the invention.

FIG. 1 is a schematic view depicting optical paths of a head-mounted display in an embodiment of the invention, referring to FIG. 1. In the embodiment, a head-mounted display 100 includes a transparent display 110, a first liquid crystal lens 120, and a second liquid crystal lens 130. The first liquid crystal lens 120 is disposed beside the transparent display 110, and the transparent display 110 is disposed between the first liquid crystal lens 120 and the second liquid crystal lens 130. To be more specific, the transparent display 110 is adapted to emit an image light beam IL1, and the image light beam IL1 is corresponding to an image display area I1 on the transparent display 110. The image light beam IL1 passes through the first liquid crystal lens 120 by phase changing of the first liquid crystal lens 120 of the head-mounted display 100, and then the image light beam IL1 passes through a pupil P. For example, the dioptric value of the first liquid crystal lens 120 becomes positive by the phase changing of the first liquid crystal lens 120 of the head-mounted display 100 so as to make the image light beam IL1 emitted from the transparent display 110 converge and pass through the pupil P. In the embodiment, for example, the pupil P may be the pupil of the user's eyes HE, and an image is formed on the retina of the user's eye HE after the image light beam IL1 passes through the pupil P. However, in other embodiments, the pupil P may also be, for example, an aperture of a general optical lens, the invention is not limited thereto. The phase changing of the liquid crystal lens means that the arrangement or the direction of the liquid crystal cell is adjusted by electric power so as to direct the direction of the light passed by the liquid crystal lens (to converge/diverge).

In the embodiment, the image light beam IL1 passing through the first liquid crystal lens 120 passes through the pupil P due to the phase changing occurs in the whole of the first liquid crystal lens 120. However, in other embodiments, the phase changing area of the liquid crystal lens 120 may be partially changed when the transparent display 110 only enable to a part of area, and the area of the first liquid crystal lens 120 in which the phase changing occurs is corresponding to the area of the transparent display 110 in which the image is displayed, the invention is not limited thereto. To be more specific, the transparent display 110 may emit the image light beam IL1 to form the corresponding image under the condition that the light transmitting state of the transparent display 110 is maintained simultaneously. Furthermore, the ambient light beam AL from the outside passes through the transparent display 110 and then passes through the pupil P. In other words, when the pupil P is, for example, the pupil of the user's eyes HE, the image light beam IL1 emitted from the transparent display 110 and the ambient light beam AL from the outside may all pass through the pupil (i.e., the pupil P), so as to form an image on the retina of the user's eyes HE. Therefore, when the head-mounted display 100 is worn in front of the user's eyes HE, both the image light beam IL1 and the ambient light beam AL may be passed through the pupil (the pupil P) of the user's eyes HE, the user may watch a virtual image VI1 formed by the image light beam IL1 corresponding to the displayed image, and the user may also watch the image of the outside (not shown) corresponding to the ambient light beam AL simultaneously. Thus, the augmented reality display effect may be achieved. In the embodiment, the transparent display 110 may be, for example, a thin film transistor-liquid crystal display (TFT-LCD), an organic light-emitting diode (OLED) display, or other types of transparent displays which is suitable for the head-mount display 100, the invention is not limited thereto.

Referring to FIG. 1 again. In the embodiment, the dioptric value of the first liquid crystal lens 120 becomes positive by the phase changing of the first liquid crystal lens 120 of the head-mounted display 100, and the dioptric value of the second liquid crystal lens 130 becomes negative by the phase changing of the second liquid crystal lens 130 of the head-mounted display 100. Specifically, the second liquid crystal lens 130 is adapted to receive the ambient light beam AL. The ambient light beam AL sequentially passes through the transparent display 110 and the first liquid crystal lens 120 after being received by the second liquid crystal lens 130. The ambient light beam AL passes through the second liquid crystal lens 130 by the phase changing of the second liquid crystal lens 130 of the head-mounted display 100, and then the ambient light beam AL sequentially passes through the transparent display 110, the first liquid crystal lens 120 and the pupil P.

In the embodiment, the dioptric value of the first liquid crystal lens 120 and the dioptric value of the second liquid crystal lens 130 may be collocated with each other, and the image light beam IL1 and the ambient light beam AL are adjusted simultaneously. The image light beam IL1 emitted by the transparent display 110 is able to pass through the pupil P after the image light beam IL1 passing through the first liquid crystal lens 120. Moreover, the image of the outside (not shown) corresponding to the ambient light beam AL is not distorted due to the ambient light beam AL does not diverge or converge after the ambient light beam AL sequentially passes through the second liquid crystal lens 130, the transparent display 110, and the first liquid crystal lens 120. To be more specific, the displayed image corresponding to the image light beam IL1 may be adjusted according to the dioptric value of the first liquid crystal lens 120 after phase changing, and the image of the outside world corresponding to ambient light beam AL may be adjusted according to the dioptric value of the second liquid crystal lens 130 after phase changing. Otherwise, in some embodiments, when the user wears the head-mounted display 100, the dioptric value of the first liquid crystal lens 120 and the dioptric value of the second liquid crystal lens 130 may be adjusted respectively according to the visual acuity of the user, such as myopia or hyperopia, so that the image light beam IL1 and the ambient light beam AL form an image on the retina of the user's eyes HE. Therefore, the user with various visual acuities may see the virtual image VI1 and the image of the outside world corresponding to the ambient light beam AL clearly without additional optical devices. For example, a myopia patient can wear the head-mounted display 100 and see the virtual age VI1 and the image of the outside world corresponding to the ambient light beam AL clearly without wearing additional glasses, the invention is not limited thereto. Otherwise, in other embodiments, other types of lenses may also be adopted to replace the first liquid crystal lens 120 or the second liquid crystal lens 130. For example, a general lens or a Fresnel lens may also be adopted to replace the first liquid crystal lens 120 or the second liquid crystal lens 130, the invention is also not limited thereto.

In the embodiment, the image light beam IL1 passes through a pupil P after the image light beam IL1 passes through the first liquid crystal lens 120 by the phase changing of the first liquid crystal lens 120 of the head-mounted display 100. Therefore, the head-mounted display 100 may emit the image light beam for displaying, such as the image light beam IL1, and receive the external (i.e., outside) ambient light beam, such as the ambient light beam AL simultaneously. Moreover, the image light beam IL1 used for displaying and the ambient light beam AL from the outside may coexist and achieve the augmented reality display effect by the phase changing in the first liquid crystal lens 120. Otherwise, the head-mounted display 100 may achieve wide field of view display effect since the transparent display 110 does not cause the problem that the angle of view is blocked. In addition, the head-mounted display 100 does not need to mount additional optical lenses and mirrors groups or additional optical reflection system that is able to reflect the image light beam many times, thus, the head-mounted display 100 becomes smaller and lighter. Besides, the head-mounted display 100 does not need to mount additional light guiding component bonded by several light splitting layer elements, therefore, the manufacturing process of the head-mounted display 100 is simplified and it is easier to produce the head-mounted display 100 massively so as to reduce manufacturing cost. In the embodiment, the head-mounted display 100 includes the transparent display 110, the first liquid crystal lens 120, and the second liquid crystal lens 130, where the transparent display 110 is disposed between the first liquid crystal lens 120 and the second liquid crystal lens 130. Therefore, the dioptric value of the first liquid crystal lens 120 by the phase changing of the first liquid crystal lens 120 and the dioptric value of the second liquid crystal lens 130 by phase changing of the second liquid crystal lens 130 may be collocated with each other to prevent the image being distorted of the outside corresponding to the ambient light beam AL. In other words, the head-mounted display 100 may simultaneously display the displayed image from the transparent display 110 corresponding to the image light beam IL1 and the image from the outside corresponding to the ambient light beam AL, thus, the image of the outside is not distorted, so as to achieve an excellent augmented reality display effect.

Figure 2A:
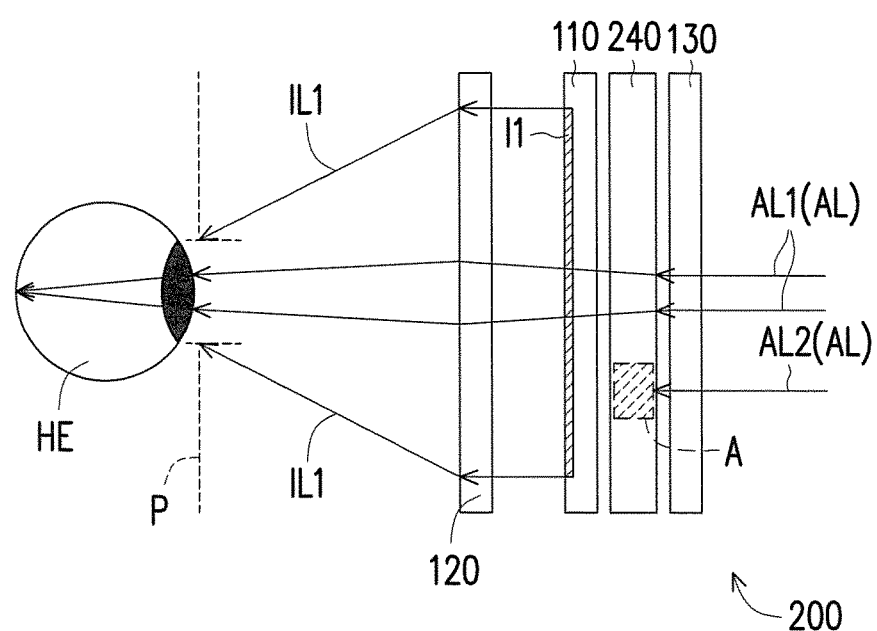
FIG. 2A is a schematic view depicting optical paths of a head-mounted display in another embodiment of the invention.
Figure 2B:
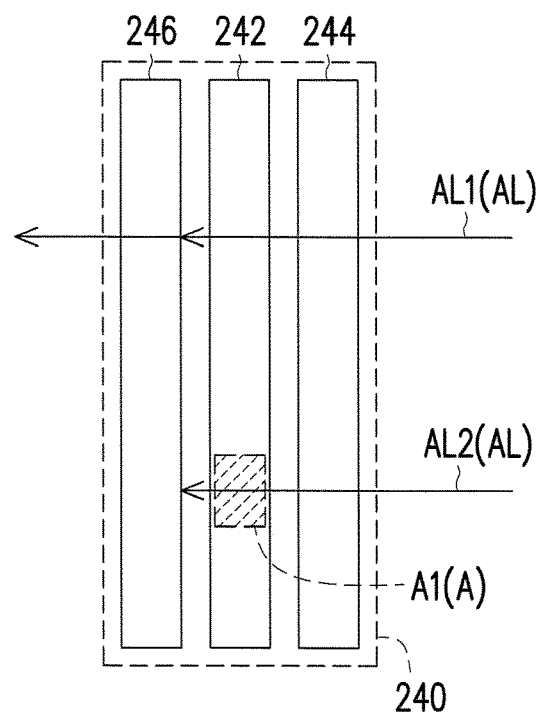
FIG. 2B is a schematic view depicting at least a lightproof part of a liquid crystal module of the embodiment in FIG. 2A.

FIG. 2A is a schematic view depicting optical paths of a head-mounted display in another embodiment of the invention, FIG. 2B is a schematic view depicting at least a lightproof part of a liquid crystal module of the embodiment in FIG. 2A, referring to FIGS. 2A and 2B simultaneously. In the embodiment, a head-mounted display 200 is similar to the head-mounted display 100. The members and the related description of the head-mounted display 200 may refer to the head-mounted display 100 in FIG. 1, and will not be repeated herein. The differences between the head-mounted display 200 and the head-mounted display 100 are described as followings. The head-mounted display 200 further includes a liquid crystal module 240, and the liquid crystal module 240 is disposed between the transparent display 110 and the second liquid crystal lens 130. The liquid crystal module 240 includes a liquid crystal panel 242, a (first) polarizing plate 244, and a (second) polarizing plate 246. The liquid crystal panel 242 is disposed between the polarizing plate 244 and the polarizing plate 246. The phase changing of at least a part of the liquid crystal panel 242 of the liquid crystal module 240 blocks a part of the ambient light beam AL so that the part of the ambient light beam AL is unable to penetrate the liquid crystal module 240.

Referring to FIG. 2B, the ambient light beam AL is generally an external light, and the polarization states of the ambient light beam AL includes P-polarization state and S-polarization state. When the ambient light beam AL passes through the polarizing plate 244, the polarizing plate 244 filters out one of the polarization states of the ambient light beam AL. For example, the polarizing plate 244 may filter out the S-polarization state of the ambient light beam AL and retain the P-polarization state. Otherwise, the polarizing plate 244 may filter out the P-polarization state of the ambient light beam AL and retain the S-polarization state. In addition, the liquid crystal panel 242 may change the polarization state of the light as needed via phase changing. For example, the liquid crystal panel 242 may transform the P-polarization state light beam into the S-polarization state light beam, or transform the S-polarization state light beam into P-polarization state light beam, or transform the P-polarization state light beam into partial P-polarization state light beam with partial S-polarization state light beam, where the invention is not limited thereto. Moreover, the polarizing plate 246 is similar to the polarizing plate 244, the polarizing plate 246 may also filter out one of the polarization states of the ambient light beam AL.

In the embodiment, when an ambient light beam AL2 which is a part of the ambient light beam AL passes through the polarizing plate 244, only the S-polarization state of the ambient light beam AL2 is able to pass the polarizing plate 244. When the ambient light beam AL2 having only the S-polarization state passes through an area A1 of the liquid crystal panel 242, the area A1 of the liquid crystal panel 242 retains the polarization state of the ambient light beam AL2 as the S-polarization state. Since the polarizing plate 246 only allows the P-polarization state of the ambient light beam to pass through, the ambient light beam AL2 having only the S-polarization state is unable to pass through the polarizing plate 246. In contrast, when an ambient light beam AL1 which is another part of the ambient light beam AL passes through the polarizing plate 244, only the light beam having the S-polarization stat is able to pass the polarizing plate 244. When the ambient light beam AL1 having S-polarization state passes through the area except the area A1 of the liquid crystal panel 242, the area except the area A1 of the liquid crystal panel 242 transforms the S-polarization state light beam into the P-polarization state light beam, so that the ambient light beam AL1 having P-polarization state is able to pass the polarizing plate 246. To be more specific, referring to FIGS. 2A and 2B simultaneously, the liquid crystal module 240 blocks a part of the ambient light beam AL by the phase changing of at least a part of the liquid crystal panel 242. The ambient light beam AL1 may pass through the liquid crystal module 240, and the ambient light beam AL2 is unable to pass through an area A, wherein the area A is corresponding to the area A1 of the liquid crystal panel 242.

In the embodiment, the location of the area A may be corresponding to at least a part of the image display area of the transparent display 110, for example, the location of the area A is corresponding to the location of at least a part of the image display area I1. When the user see the virtual image (not shown) formed by the image light beam IL1 corresponding to the image display area I1, at least a part of the virtual image formed by the image light beam IL1 is not overlapped with the image of the outside (not shown) corresponding to the ambient light beam AL. Therefore, the image of the outside corresponding to the ambient light beam AL does not interfere with at least a part of the virtual image (corresponding to the area A of the liquid crystal panel 242) formed by the image light beam IL1. For example, if the user wears the head-mounted display 200 when riding a motorcycle or other suitable transportations, the head-mounted display 200 will display driver assistance information at a corner of the user' sight, such as driving speed, road speed limit, or route navigation, etc. If the ambient light beam AL is extremely strong, the user cannot distinctly see the driver assistance information because of the interference of the ambient light beam AL. At this time, the liquid crystal module 240 may block a part of the ambient light beam AL at the area displaying the driver assistance information, so the driver assistance information may be distinctly displayed. Otherwise, the liquid crystal panel 242 may adjust the ratio of the S polarization state to the P-polarization state in the ambient light beam AL based on the phase changing, so the luminous intensity of the ambient light beam AL is further adjusted by the liquid crystal module 240. Therefore, the head-mounted display 200 may achieve a function of sunglasses based on the phase changing described above. In some embodiments, the head-mounted display 200 may further adjust the luminous intensity of the ambient light beam AL passing through the liquid crystal module 240 according to the variation of the luminous intensity of the ambient light beam AL, so the user is able to distinctly watch the displayed image corresponding to the image light beam IL1 and the image of the outside corresponding to the ambient light beam AL when the head-mounted display 200 is under various conditions of the ambient light beam AL. Besides, in other embodiments, the phase changing may also occur in the entire liquid crystal panel 242 to prevent the ambient light beam AL from being pass through, such that the user cannot see the ambient light beam AL corresponding to the image of the outside when wearing the head-mounted display. At the same time, the head-mounted display may achieve the virtual reality (VR) display effect. The head-mounted display 200 in the embodiment and the head-mounted display 100 in the embodiment depicted in FIG. 1 have similar technical features. The head-mounted display 200 may achieve wide field of view display effect and have a smaller volume, a lighter weight, and a more simplified manufacturing process.

Figure 3:
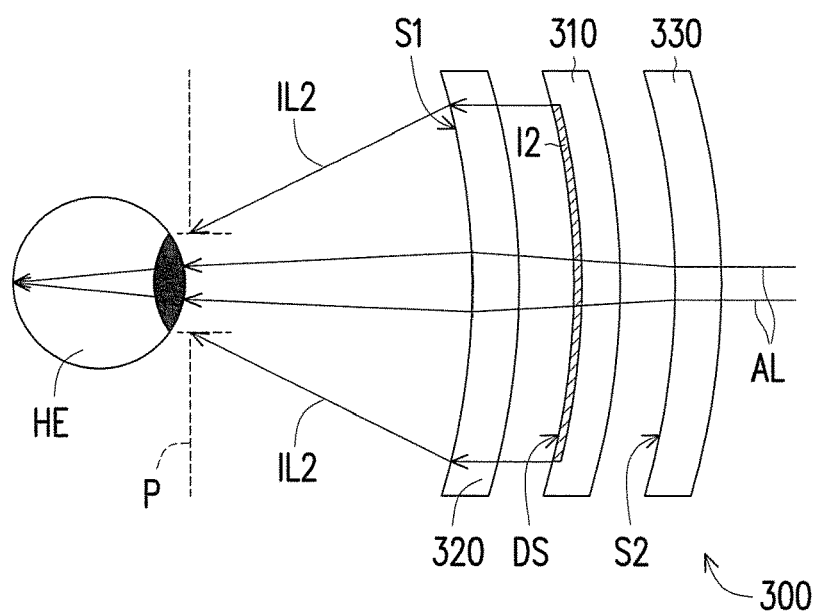
FIG. 3 is a schematic view depicting optical paths of a head-mounted display in another embodiment of the invention.

FIG. 3 is a schematic view depicting optical paths of a head-mounted display in another embodiment of the invention, referring to FIG. 3. In the embodiment, a head-mounted display 300 is similar to the head-mounted display 100. The members and the related description of the head-mounted display 300 may refer to the head-mounted display 100 in FIG. 1, and will not be repeated herein. The differences between the head-mounted display 300 and the head-mounted display 100 are described as followings. The head-mounted display 300 includes a transparent display 310, a first liquid crystal lens 320, and a second liquid crystal lens 330, and the transparent display 310 is disposed between the first liquid crystal lens 320 and the second liquid crystal lens 330. The transparent display 310 is a curved transparent display, a first surface S1 facing the pupil P of the first liquid crystal lens 320 is a curved surface, and a second surface S2 facing the pupil P of the second liquid crystal lens 330 is a curved surface. To be more specific, the display surface DS of the transparent display 310 faces the pupil P, the display surface DS is a concave surface, and both the first surface S1 and the second surface S2 are concave surfaces. In addition, the curvatures of the display surface DS of the transparent display 310, the first surface S1 of the first liquid crystal lens 320, and the second surface S2 of the second liquid crystal lens 330 are equivalent with each other. In the embodiment, the transparent display 310 is adapted to emit an image light beam IL2, and the image light beam IL2 is corresponding to an image display area I2 on the transparent display 310.

In comparison with the flat transparent display 110 of the aforementioned embodiment, a curved transparent display 310 may be adopted in the embodiment to reduce aberration of the optical system (i.e., the transparent display, the first liquid crystal lens and the second liquid crystal lens) of the head-mounted display 300, such as to reduce distortion aberration of the optical system or to reduce field curvature, such that the head-mounted display 300 achieves an excellent optical image quality. In addition, the curved transparent display 310 may be adopted to achieve a streamlined and stylish design in the appearance of the head-mounted display 300. Simultaneously, the head-mounted display 300 may provide a better coverage property by adopting the curved transparent display 310, so as to increase the application fields of the head-mounted display 300. For example, the head-mounted display 300 may be used as windproof glasses when the user rides a bicycle, however, the invention is not limited thereto. The head-mounted display 300 in the embodiment and the head-mounted display 100 in the embodiment depicted in FIG. 1 have similar technical features. The head-mounted display 300 may achieve wide field of view display effect and have a smaller volume, a lighter weight, and a simplified manufacturing process.

In summary, the embodiments of the invention have at least one of the advantages or effects below. In an embodiment of the invention, the transparent display of the head-mounted display is disposed between the first liquid crystal lens and the second liquid crystal lens. The transparent display is adapted to emit the image light beam, and the second liquid crystal lens is adapted to receive the ambient light beam. The image light beam passes through the first liquid crystal lens by phase changing of the first liquid crystal lens of the head-mounted display, and then the image light beam converges to a pupil after. Therefore, the head-mounted display may emit the image light beam used for displaying and receive the ambient light beam from the outside world at the same time, and the image light beam and the ambient light beam from the outside coexist and achieve the augmented reality display effect by the phase changing occurring in the first liquid crystal lens. Since the transparent display does not cause the problem that the angle of view is blocked, thus, the head-mounted display may achieve wide field of view display effect. Otherwise, the head-mounted display does not need additional optical lenses and mirrors group or the optical reflection system to reflect the image light beam many times, thus, the head-mounted display becomes smaller and lighter. Besides, the head-mounted display does not need the light guiding component bonded by several light splitting layer elements, therefore, the manufacturing process of the head-mounted display is simplified and it is easier to produce the head-mounted display massively.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-mounted display, comprising:
   a transparent display, adapted to emit an image light beam;
   a first liquid crystal lens, disposed beside the transparent display; and
   a second liquid crystal lens, wherein the transparent display is disposed between the first liquid crystal lens and the second liquid crystal lens, and the second liquid crystal lens is adapted to receive an ambient light beam, wherein the image light beam passes through the first liquid crystal lens by a phase changing of the first liquid crystal lens, and then the image light beam passes through a pupil, and wherein the ambient light beam passes through the second liquid crystal lens by the phase changing of the second liquid crystal lens of the head-mounted display, and then the ambient light beam sequentially passes through the transparent display, the first liquid crystal lens and the pupil,
   and wherein a displayed image corresponding to the image light beam is adapted to be adjusted according to a dioptric value of the first liquid crystal lens by the phase changing of the first liquid crystal lens, and an image of the outside world corresponding to ambient light beam is adapted to be adjusted according to a dioptric value of the second liquid crystal lens by the phase changing of the second liquid crystal lens.

2. The head-mounted display as recited in claim 1, further comprising a liquid crystal module, wherein the liquid crystal module is disposed between the transparent display and the second liquid crystal lens, the liquid crystal module comprises a liquid crystal panel and two polarizing plates, the liquid crystal panel is disposed between the two polarizing plates, and the phase changing of at least a part of the liquid crystal panel of the liquid crystal module blocks a part of the ambient light beam.

3. The head-mounted display as recited in claim 1, wherein a dioptric value of the first liquid crystal lens becomes positive by the phase changing of the first liquid crystal lens of the head-mounted display, and a dioptric value of the second liquid crystal lens becomes negative by the phase changing of the second liquid crystal lens of the head-mounted display.

4. The head-mounted display as recited in claim 1, wherein the transparent display is a curved transparent display, a first surface of the first liquid crystal lens facing the pupil is a curved surface, and a second surface of the second liquid crystal lens facing the pupil is a curved surface.

5. The head-mounted display as recited in claim 4, wherein a display surface of the transparent display faces the pupil, the display surface is a concave surface, and both the first surface and the second surface are concave surfaces.

6. The head-mounted display as recited in claim 4, wherein curvatures of the display surface of the transparent display, the first surface, and the second surface are equivalent.

* * * * *